United States Patent [19]

Hirosaki et al.

[11] Patent Number: 5,093,843
[45] Date of Patent: Mar. 3, 1992

[54] DIGITAL COMMUNICATIONN SYSTEM USING PARTIAL RESPONSE AND BIPOLAR CODING TECHNIQUES

[75] Inventors: Botaro Hirosaki; Hiroshi Shimizu; Yasuhiro Tsujimura; Toshihisa Yoshida, all of Tokyo, Japan

[73] Assignee: NEC Corporation, Tokyo, Japan

[21] Appl. No.: 234,667

[22] Filed: Aug. 22, 1988

[30] Foreign Application Priority Data

Aug. 21, 1987 [JP]  Japan .................. 62-208705

[51] Int. Cl.$^5$ ...................... H04L 25/34; H04L 25/49
[52] U.S. Cl. ........................................ 375/18; 375/11; 375/27
[58] Field of Search ........................ 375/17, 18, 20, 27, 375/36, 11, 12; 333/4 R, 17 M, 17.2, 17.3; 341/76, 143

[56] References Cited

U.S. PATENT DOCUMENTS

| | | | |
|---|---|---|---|
| 3,388,330 | 6/1968 | Kretzmer | 375/18 |
| 3,456,199 | 7/1969 | Van Gerwen | 332/11 |
| 3,457,510 | 7/1969 | Lender | 375/60 |
| 3,679,977 | 7/1972 | Howson | 375/18 |
| 4,055,727 | 10/1977 | Katoh | 375/18 |
| 4,114,710 | 9/1978 | Katoh et al. | 375/18 |
| 4,177,277 | 9/1978 | van den Elzen et al. | 375/18 X |
| 4,273,963 | 6/1981 | Seidel | 375/14 X |
| 4,367,495 | 6/1983 | Mita et al. | 360/39 |

Primary Examiner—Benedict V. Safourek
Assistant Examiner—Tesfaldet Bocure
Attorney, Agent, or Firm—Sughrue, Mion, Zinn, Macpeak & Seas

[57] ABSTRACT

A digital communication system comprises a transmitter including a (1,0) precoder for precoding a unipolar input digital data stream and a bipolar converter for converting the output signal of the (1,0) precoder into a bipolar signal. The bipolar signal is transmitted through a metallic transmission line to a receiver. The receiver comprises a digitizer for digitizing the transmitted signal to and a line equalization filter for equalizing losses encountered during propagation through the transmission line. A (1,1) converter is provided for converting the output signal of the line equalization filter in a manner opposite to the bipolar converter. A clock recovery circuit derives sample timing pulses from the output of the line equalization filter. A decoder responds to the sample timing pulses to detect symbols from the output signal of the (1,1) converter to generate a replica of the original digital data stream.

3 Claims, 4 Drawing Sheets (1,1) PARTIAL RESPONSE SIGNALLING

BIPOLAR SIGNALLING

DIGITAL COMMUNICATIONN SYSTEM USING PARTIAL RESPONSE AND BIPOLAR CODING TECHNIQUES

BACKGROUND OF THE INVENTION

The present invention relates generally to a digital communication system for transmitting a digital signal over a metallic cable having a transmission attenuation characteristic $\sqrt{f}$.

With the introduction of advancing technologies in data terminals, they are now capable of operating at a speed on the order of megabits per second. Various networks have been developed to allow efficient transmission of data between high performance data terminals. Most of these networks employ optical fibers as transmission media. Although satisfactory for transmitting such high speed data from data terminals to network access points, optical transmission media require the use of optical transceiver which significantly increase the cost of the data terminals. One simplest method to overcome this problem is to employ twisted wire pairs. However, signals transmitted on wire pairs attenuate significantly as the frequency of the signal increases as is known by the formula $\sqrt{f \cdot l}$, where f is the frequency of the signal being transmitted and l, the length of the transmission line. Multilevel signalling and partial response signalling are known as efficient methods for transmitting high speed data over a twisted pair of wires. However, multilevel signalling requires an adaptive equalizer at the receive end of the system to automatically suppress intersymbol interference (at sample points) which noticeably increases in applications which transmit signals having four levels or greater. Since the adaptive equalizer needs to perform discrete control on sample values if high precision operation is required, the harware necessary to implement such requirements would significantly increase in volume. Partial response signalling solves this problem. For a given number of signalling levels, a comparison between multilevel signalling and partial response signalling indicates that the latter is more advantageous for use with transmission lines having the $\sqrt{f}$ attenuation characteristic. However, the partial response technique overfilters the encoded signal and so it limits the spectrum of transmission narrower than the Nyquist bandwidth ($f_0/2$, where $f_0$ is the symbol clock frequency). This results in a data bit stream having a small amount of clock components and makes it difficult for a nonlinear clock recovery circuit to generate the necessary timing signal.

From the clock recovery view point, bipolar coding technique is suitable. Since a signal is said to have ample clock components if it exhibits a high energy spectral density in the neighborhood of frequency $f_0/2$, the bipolar coded signal is the case in point. However, the bipolar signal has a greater range of mainlobe energy density than in the case of partial response signalling and so it requires a wideband equalizer, which results in a low signal to noise ratio. In addition, because of the three-level signalling, the bipolar coding adds complexity to the problem of signal to noise ratio.

FIG. 1 is a block diagram of a prior art digital communication system employing a (1, 1) partial response signalling scheme (which is known as a class-1 partial response signalling). An input binary digital data stream $a_n$ with symbol clock intervals T is passed through a precoder 45 formed by a delay line of length T and a modulo-2 adder and encoded with an intermediate data stream $b_n$ (where n is a sequence number identifying each symbol). The intermediate data stream $b_n$ is converted by a (1, 1) conversion circuit 46 into a (1, 1) multilevel data stream $c_n$ which is transmitted through a transmission line 47 to digitizer 48 at the receive end of the system. As shown in the drawing, this (1, 1) conversion circuit is made up of a delay line of length T and an adder. The (1, 1) multilevel data stream $c_n$ is converted by the digitizer 48 into a digital signal and fed to a transmission line equalizing filter 49 to compensate for the transmission loss. The output of the equalization filter 49 is applied to a decoder 50 where the input signal is converted to an output digital data stream $d_n$ which is a replica of the original data stream.

The following relations hold between the data streams $a_n$, $b_n$, $c_n$ and $d_n$:

$b_n = b_{n-1} \oplus a_n$ $c_n = b_n + b_{n-1}$ $d_n = [c_n]_{mod2}$, (where $d_n = 0$ when $c_n$ is even, $d_n = 1$ when $c_n$ is odd), where $\oplus$ represents modulo-2 summation.

If $\{a_n\} = \{101100101\}$, then
$\{b_n\} = \{110111001\}$
$\{c_n\} = \{121122101\}$, and
$\{d_n\} = \{101100101\}$.

As shown in FIG. 2a, the spectral component of the (1, 1) partial response signalling code at one-half the clock frequency is significantly small, making it difficult for the receive end of the system to recover clock timing signals. On the other hand, the bipolar encoded signal has a spectral peak at one-half the clock frequency as shown in FIG. 2b, indicating that the bipolar signal is rich with clock timing information.

From the view point of signal to noise ratio in a $\sqrt{f}$ transmission line, the (1, 1) partial response signalling is advantageous over the bipolar signalling since the former needs only to detect the mainlobe of the spectrum at the receive end of the system, while the latter needs to detect a wideband mainlobe of the spectrum with a resultant decrease in signal to noise ratio. Therefore, the use of the partial response signalling to improve the signal to noise ratio results in a poor timing recovery performance, while the use of the bipolar signalling technique results in a low signal to noise ratio.

SUMMARY OF THE INVENTION

It is therefore an object of the present invention to provide a digital communication system which combines the advantages of the partial response signalling and bipolar coding techniques and eliminates the disadvantages of the prior art.

The digital communication system of the present invention comprises a transmitter including a (1, 0) precoder for precoding a unipolar input digital data stream and a bipolar converter for converting the output signal of the (1, 0) precoder into a bipolar signal, which is transmitted over a transmission line to a receiver. The receiver comprises a line equalization filter for equalizing losses encountered during propagation through the transmission line and a (1, 1) converter for converting the output signal of the equalization filter in a manner opposite to the bipolar converter. A clock recovery circuit derives sample timing pulses from the output signal of the line equalization filter. In response to the sample timing pulses a decoder detects symbols from the output signal of the (1, 1) converter to generate a replica of the original digital data stream.

In a specific aspect of the present invention, 1 the (1, 0) precoder has a transfer function $1/(1 \oplus z^{-2})$ which is implemented by a modulo-2 adder for modulo-2 summing the unipolar input digital data stream with a second signal, and a delay line for introducting a delay time 2T to an output signal from the modulo-2 adder and supplying the delayed signal to the modulo-2 adder as the second signal, (where T represents intervals between successive symbols). The bipolar converter has a transfer function $1-z^{-1}$ which is implemented by a second delay line that introduces a delay time T to the output signal of the precoder and a subtractor for subtracting the output of the second delay line from the output of the precoder.

At the receiver, the (1, 1) converter has a transfer function $1+z^{-1}$ which is realized by a third delay line for introducing a delay time T to the output signal of the line equalization filter and an adder for summing the output signal of the third delay line with the output signal of the line equalization filter and suppresses the higher frequency components of the output signal of the line equalization filter. The decoder provides modulo-2 conversion on the output of the (1, 1) converter so that bipolar format of the output signal of the (1, 1) converter is converted to unipolar format.

BRIEF DESCRIPTION OF THE DRAWINGS

The present invention will be described in further detail with reference to the accompanying drawings, in which.

DETAILED DESCRIPTION

Figure 1:
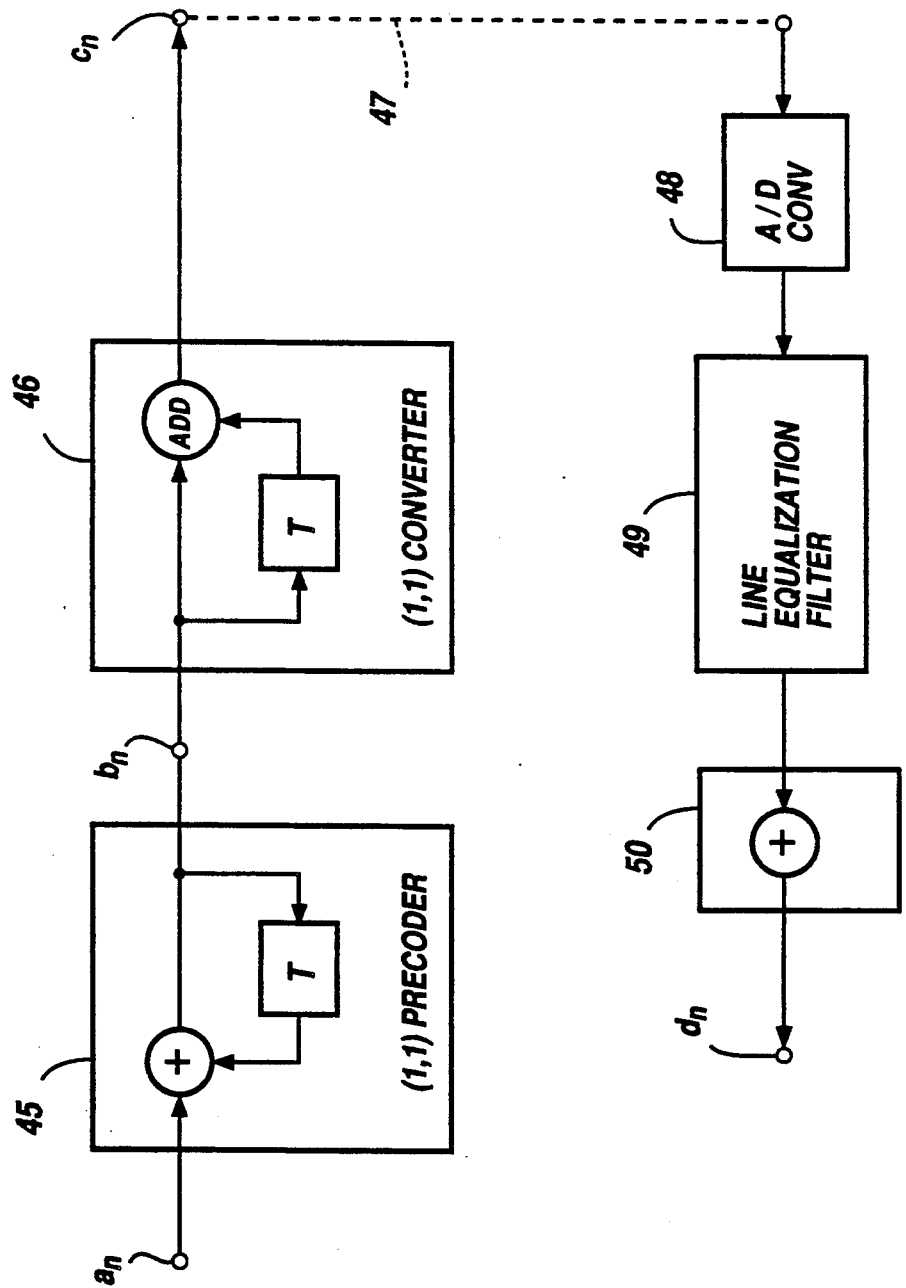
FIG. 1 is a block diagram of a prior art digital communication system.
Figure 2A:
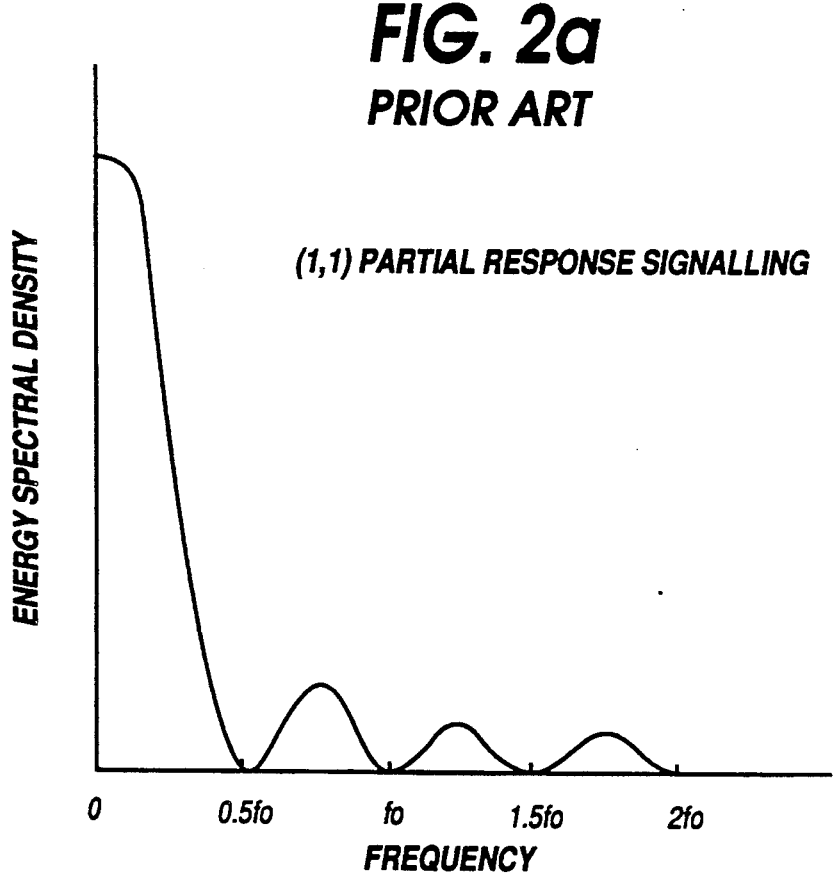
FIGS. 2a and 2b are graphic representations of spectral energy densities of conventional partial response and bipolar coding systems, respectively.
Figure 2B:
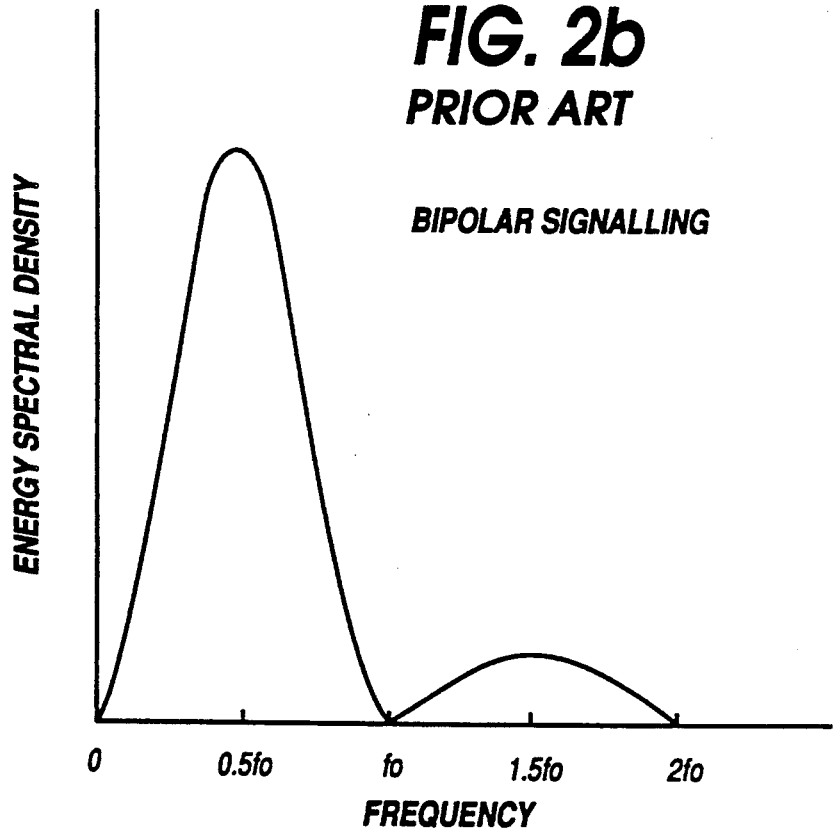
Figure 3:
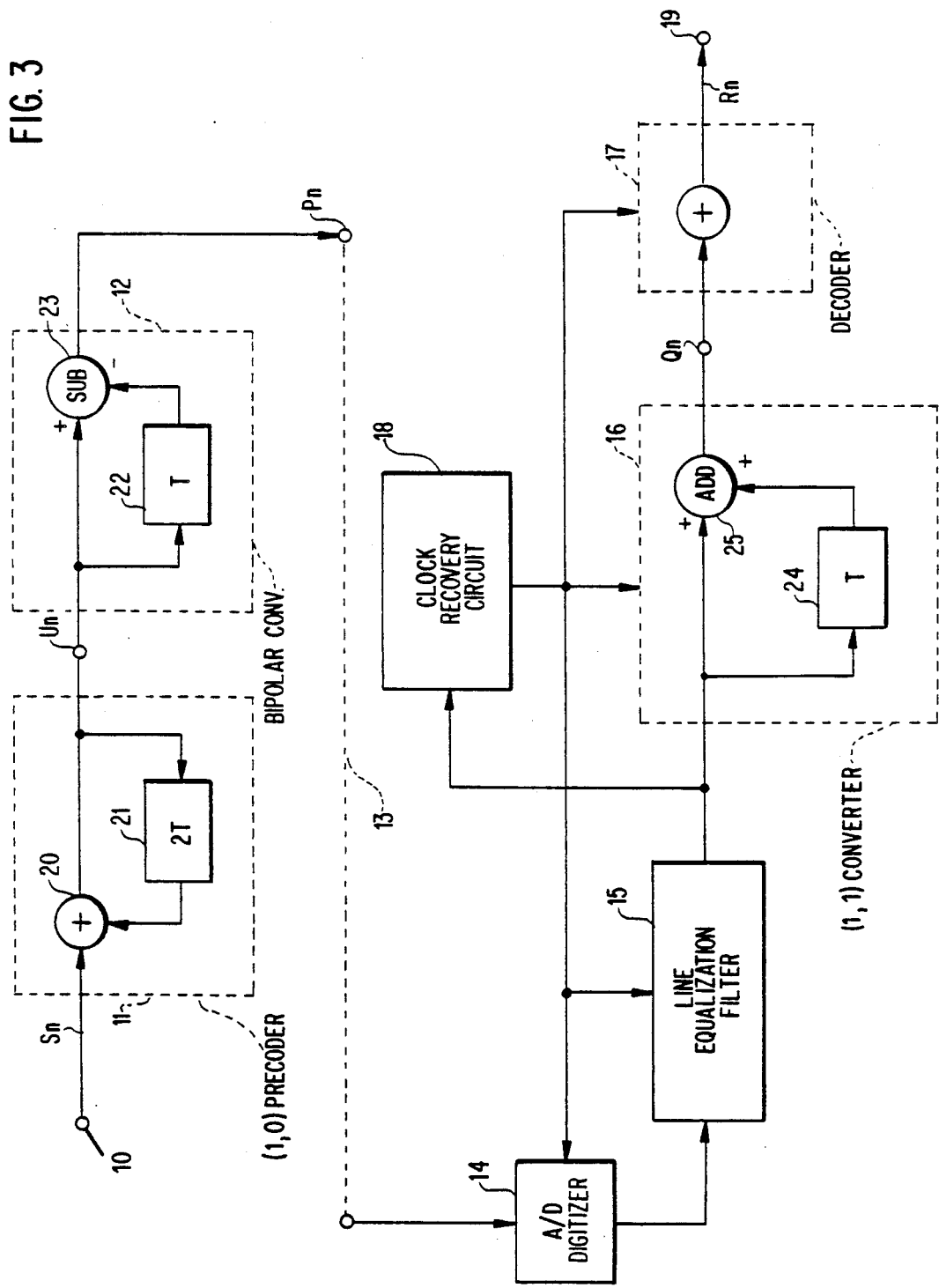
FIG. 3 is a block diagram of a digital communication system according to the present invention.

Referring now to FIG. 3, a digital communication system according to the present invention comprises a (1, 0) precoder 11 which receives a binary (unipolar) digital data stream $S_n$ at input terminal 10 (where "n" represents a sequence number identifying each symbol or bit). Preceder 11 comprises a modulo-2 adder 20 and a delay line 21 of length 2T (where T is sample clock intervals between successive symbols) which is connected to the output of the modulo-2 adder 20. Modulo-2 adder 20 provides modulo-2 summation between the input data stream $S_n$ and the output of the delay line 21. The (1, 0) precoder 11 has a transfer function $D(z)=1/(1 \oplus z^{-2})$ to convert the binary input data $S_n$ into an intermediate data stream $U_n$ which is represented by the relation $U_n = S_n \oplus U_{n-2}$.

The intermediate data stream $U_n$ is supplied to a bipolar converter 12 formed by a delay line 22 of length T and a subtractor 23 which subtracts the output of delay line 22 from the output of precoder 11. Bipolar converter 12 has a transfer function $A(z)=1-z^{-1}$ with which it converts the intermediate data stream $U_n$ into a bipolar data stream $P_n$ which is represented by the relation $P_n = U_n - U_{n-1}$.

The bipolar data stream $P_n$ is transmitted through a metallic transmission line 13 having a $\sqrt{f}$ transmission characteristic and applied to a digitizer 14 where the amplitude of the bipolar signal is converted to a digital value and supplied to a line equalizing filter 15.

Line equalization filter 15 is provided to compensate for phase and amplitude distortions of the transmitted signal experienced during propagation through the transmission medium and generates a signal that corresponds in waveform to the bipolar input to the transmit end of the line 13.

Figure 4:
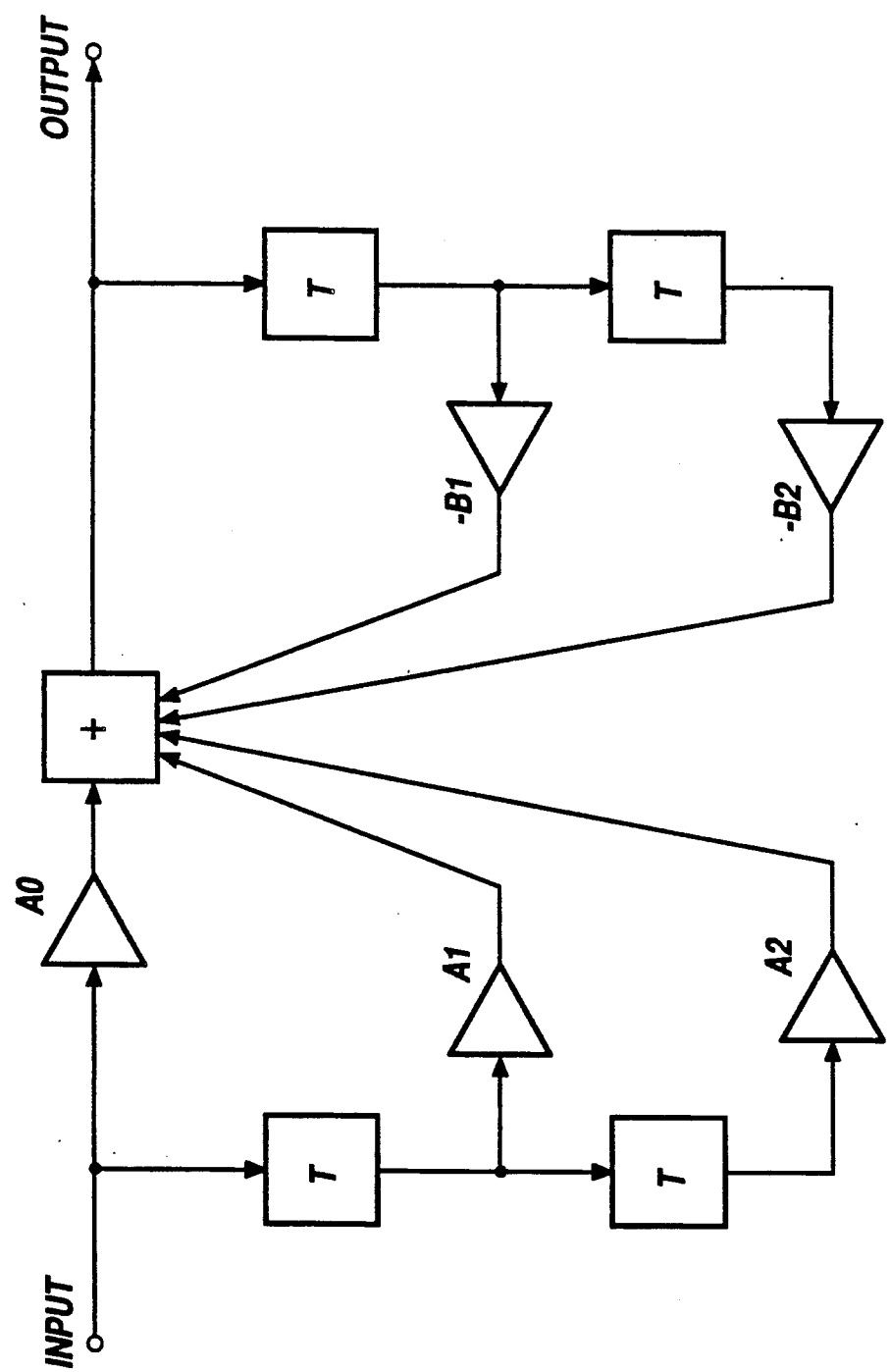
FIG. 4 is a circuit diagram of a typical example of the line equalizing filter of FIG. 3.

FIG. 4 shows a typical example of the line equalizing filter 15. The digital data input $X_n$ to be equalized by filter 15 is translatted into a series of outputs $Y_n$ which is represented by:

$$Y_n = A_0 X_n + A_1 X_{n-1} + A_2 X_{n-2} - B_1 Y_{n-1} - B_2 Y_{n-2}$$

where, $A_0$, $A_1$, $A_2$, $B_1$ and $B_2$ satisfy the following transfer function H(z) which approximates the transmission characteristic of the line 13:

$$H(z) = \frac{A_0 + A_1 z^{-1} + A_2 z^{-2}}{1 + B_1 z^{-1} + B_2 z^{-2}}$$

The bipolar output of line equalizer 15 feeds a (1, 1) converter 16 which comprises a delay line 24 of length T coupled to the output of filter 15 and an adder 25 which sums the output of delay line 24 with the equalized data stream to produce a $(1, 0, -1)$ partial response signal $Q_n$ which is represented by $Q_n = P_n + P_{n-1}$. The (1, 1) converter 16 has a frequency transfer function $H(f) = \cos(\pi f/f_0)$, (where $H(f)=0$ if $|f|>f_0$) to suppress high frequency noise introduced by the transmission link 13 and exhibits a transmission characteristic $B(z)=1+z^{-1}$.

Thus, the transmission characteristic C(z) of the system from the output of $(1, 0, -1)$ precoder 11 to the input of decoder 17 is given by $C(z)=A(z)B(z)=1-z^{-2}$. Since the precoder 11 has the transfer function $D(z)=1/(1 \oplus z^{-2})$, the transfer function E(z) of a path from the input of precoder 11 to the input of decoder 17 is given by $E(z)=(1-z^{-2})/(1 \oplus z^{-2})$.

The output of the (1, 1) converter 16 is fed to a decoder 17 which performs the following modulo-2 binary conversion on the partial response waveform:

$$[E(z)]_{mod2} = \left[\frac{1-z^{-2}}{1 \oplus z^{-2}}\right]_{mod2}$$

$$= \frac{[1-z^{-2}]_{mod2}}{1 \oplus z^{-2}}$$

$$= \frac{1 \oplus z^{-2}}{1 \oplus z^{-2}} = 1$$

whereby, "$\pm 1$" bit is converted to "1" bit and "0" bit is converted to "0" bit to produce a unipolar output data stream $R_n$ at an output terminal 19 which is a replica of the original binary data stream. The output data stream $R_n$ is given by $R_n = [Q_n]_{mod2}$ (where $R_n=0$ if $Q_n$ is even and $R_n=1$ if $Q_n$ is odd).

This precoding process transforms the input data in such a manner that the output level at the detector directly indicates the original data without comparison to the previous sample value.

If the input data stream $\{S_n\}$ is given by a bit stream $\{1\ 0\ 1\ 1\ 0\ 0\ 1\ 0\ 1\}$, then the following bit streams exist:

$\{U_n\} = \{1\ 0\ 0\ 1\ 0\ 1\ 1\ 1\ 0\}$
$\{P_n\} = \{1\ -1\ 0\ 1\ -1\ 1\ 0\ 0\ -1\}$
$\{Q_n\} = \{1\ 0\ -1\ 1\ 0\ 0\ 1\ 0\ -1\}$
$\{R_n\} = \{1\ 0\ 1\ 1\ 0\ 0\ 1\ 0\ 1\}$ which is identical to the unipolar input data stream $S_n$. It is seen therefore that the communication system of the present invention is equivalent to a (1, 0, −1) partial response system.

The sample clock timing of the digitizer 14, line equalizer 15, the (1, 1) converter 16 and decoder 17 is obtained by a clock recovery circuit 18 which derives its input from the clock-abundant bipolar signal from the output of line equalizer 15. Thus, pulse detection by decoder 17 can be made precisely at correct sample times. Since the (1, 0, −1) partial response signal is rendered tolerant of transmission distortions due to the reduction of the high frequency spectral components by the converter 16 which is tolerant of high frequency noise, pulse detection by decoder 17 can be performed with a high signal-to-noise ratio.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A digital communication system comprising:

a transmission line having a transmission attenuation characteristic $\sqrt{f}$, where f represents the frequency of a signal transmitted through said transmission line;

a (1, 0) precoder having a transfer function $1/(1 \oplus z^{-2})$ for precoding a unipolar input digital data stream, where $\oplus$ indicates modulo summation and z is a delay operator;

a bipolar converter for converting the output signal of said (1, 0) precoder into a bipolar signal and transmitting the bipolar signal through said transmission line to a receiver end of the system;

a line equalization filter at said receiver end for equalizing the losses of the transmitted bipolar signal experienced during propagation through said transmission line;

a (1, 1) converter having a transfer function $1 + z^{-1}$ connected to the output of said line equalization filter;

a decoder for detecting symbols from the output signal of said (1, 1) converter to generate a replica of said digital data stream; and a clock recovery circuit for deriving sample timing pulses from the output signal of said line equalization filter and supplying said timing pulses to said decoder.

2. A digital communication system as claimed in claim 1, further comprising a digitizer for redigitizing said bipolar signal transmitted through said transmission line and applying the redigitized bipolar signal to said line equalization filter.

3. A digital communication system as claimed in claim 1, wherein said (1, 0) precoder comprises a modulo-2 adder having a first input terminal for receiving the unipolar input digital data stream and a second input terminal, and a first delay line for delaying an output signal from the modulo-2 adder for a delay time 2T and supplying the delayed signal to the second input of the modulo-2 adder, where T represents intervals between successive symbols;

wherein said bipolar converter comprises a second delay line for introducing a delay time T to the output signal of said precoder and a subtractor for subtracting the output signal of the second delay line from the output signal of said precoder;

wherein said (1, 1) converter comprises a third delay line for introducing a delay time T to the output signal of said line equalization filter and an adder for summing the output signal of the third delay line with the output signal of said line equalization filter, said (1, 1) converter suppressing higher frequency components of the output signal of said line equalization filter; and wherein said decoder comprises means for providing modulo-2 conversion on the output of said (1, 1) converter so that bipolar format of the output signal of said (1, 1) converter is converted to unipolar format.

* * * * *

UNITED STATES PATENT AND TRADEMARK OFFICE
CERTIFICATE OF CORRECTION

Page 1 of 2

PATENT NO. : 5,093,843

DATED : March 3, 1992

INVENTOR(S) : Botaro HIROSAKI, Hiroshi SHIMIZU, Yasuhiro TSUJIMURA and Toshihisa YOSHIDA It is certified that error appears in the above-identified patent and that said Letters Patent is hereby corrected as shown below:

On the Title page, item [54]
In the Title, delete "COMMUNICATIONN" and insert --COMMUNICATION--;

On the Title page, item [57]
In the Abstract, line 8, delete "to";

Col. 1, line 1, title, delete "COMMUNICATIONN" and insert --COMMUNICATION--;

Col. 1, line 20, delete "transceiver" and insert --transceivers--;

Col. 1, line 37, delete "harware" and insert --hardware--;

Col. 3, line 3, delete the first occurrence of "1";

Col. 3, line 49, delete "Preceder" and insert --Precoder--;

UNITED STATES PATENT AND TRADEMARK OFFICE
CERTIFICATE OF CORRECTION

PATENT NO. : 5,093,843
DATED : March 3, 1992
INVENTOR(S) : Botaro Hiroskali, et. al.

It is certified that error appears in the above-indentified patent and that said Letters Patent is hereby corrected as shown below:

Col. 3, line 68, delete "$\sqrt{f}$" and insert -- $\sqrt{f}$ --.

Signed and Sealed this

Nineteenth Day of October, 1993

Attest:

BRUCE LEHMAN

*Attesting Officer*   Commissioner of Patents and Trademarks